(12) United States Patent
Anand

(10) Patent No.: US 10,135,997 B2
(45) Date of Patent: *Nov. 20, 2018

(54) TECHNOLOGIES FOR CONVERTING MOBILE COMMUNICATIONS NETWORK BILLING RECORDS

(71) Applicant: Sudir Kumar Anand, Cincinnati, OH (US)

(72) Inventor: Sudir Kumar Anand, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/697,810

(22) Filed: Sep. 7, 2017

(65) Prior Publication Data

US 2017/0366678 A1 Dec. 21, 2017

Related U.S. Application Data

(63) Continuation of application No. 14/946,319, filed on Nov. 19, 2015, now Pat. No. 9,762,743.
(Continued)

(51) Int. Cl.
*H04M 11/00* (2006.01)
*H04M 15/00* (2006.01)
*H04L 12/14* (2006.01)

(52) U.S. Cl.
CPC ........ *H04M 15/41* (2013.01); *H04L 12/1403* (2013.01); *H04L 12/1428* (2013.01);
(Continued)

(58) Field of Classification Search
CPC ....... H04W 4/25; H04W 12/12; H04W 12/06; H04M 2215/32; H04M 15/15
See application file for complete search history.

(56) References Cited

U.S. PATENT DOCUMENTS 8,111,630 B2 2/2012 Kovvali et al.
8,812,609 B2 8/2014 Frydman et al.
(Continued)

FOREIGN PATENT DOCUMENTS

EP 2518937 A2 10/2012

OTHER PUBLICATIONS

Rohde et al.; "LTE-Advanced (3GPP Rel. 12) Technology Introduction—White Paper;" Jun. 2014; 60 pages.
(Continued)

*Primary Examiner* — Steve D Agosta
(74) *Attorney, Agent, or Firm* — Ulmer & Berne LLP

(57) ABSTRACT

Technologies for converting mobile communications network billing records include a billing record converter system. The billing record converter system receives a data usage billing record associated with a mobile computing device communicatively coupled to a long term evolution wireless communications network. The received data usage billing record is formatted according to a real-time data usage billing record format. The received data usage billing record is converted into a new data usage billing record formatted according to a roaming data usage billing record format that corresponds to a legacy wireless communications network. The new data usage billing record is transmitted to a billing system of the legacy wireless communications network for processing. In some embodiments, the billing record converter system cumulates and converts multiple data usage billing records associated with the mobile computing device into the new data usage billing record. Other embodiments are described and claimed.

15 Claims, 5 Drawing Sheets

Related U.S. Application Data

(60) Provisional application No. 62/081,785, filed on Nov. 19, 2014.

(52) U.S. Cl.
CPC ........... *H04M 15/43* (2013.01); *H04M 15/53* (2013.01); *H04M 15/8038* (2013.01); *H04M 15/8207* (2013.01); *H04M 15/8214* (2013.01); *H04L 12/1417* (2013.01); *H04L 12/1421* (2013.01); *H04L 12/1435* (2013.01)

(56) References Cited

U.S. PATENT DOCUMENTS

| | | | |
|---|---|---|---|
| 9,762,743 B2 | 9/2017 | Anand | |
| 2009/0264097 A1* | 10/2009 | Cai | G06Q 30/04 455/406 |
| 2010/0197268 A1* | 8/2010 | Raleigh | H04L 12/14 455/408 |
| 2012/0302208 A1* | 11/2012 | Lovsen | H04L 12/14 455/406 |
| 2014/0357219 A1* | 12/2014 | Nicolaescu | H04M 15/8038 455/406 |
| 2016/0142554 A1 | 5/2016 | Anand | |

OTHER PUBLICATIONS

GSM Association, "TAP 3.12 Format Specification, Version 32.3;" Sep. 15, 2014; 292 pages.

International Search Report for International Application No. PCT/US2015/061614; dated Feb. 2, 2016; 2 pages.

Written Opinion for International Application No. PCT/US2015/061614; dated Feb. 2, 2016; 4 pages.

* cited by examiner

TECHNOLOGIES FOR CONVERTING MOBILE COMMUNICATIONS NETWORK BILLING RECORDS

CROSS REFERENCE TO RELATED APPLICATIONS

This application is a continuation of U.S. application Ser. No. 14/946,319, filed Nov. 19, 2015, which claims the benefit of U.S. Provisional Patent Application Ser. No. 62/081,785, filed Nov. 19, 2014, the disclosures of which are hereby incorporated by reference herein in their entirety.

TECHNICAL FIELD

The technologies described below relate generally to the field of converting data usage billing records on 4G LTE networks into data usage records (e.g., records indicative of data received at a user's device and/or records indicative of data transmitted from a user's device) that are compatible with 2G/3G billing systems. More particularly, the technologies relate to the field of processing 4G LTE 3rd Generation Partnership Project Online Charging System (3GPP OCS) usage records into Transferred Account Procedure (TAP) records that are received by 2G/3G billing systems as visited network usage billing records.

BACKGROUND

Wireless communication providers are increasingly upgrading legacy communication networks to support newer communication standards and equipment. For example, second generation (2G) and third generation (3G) wireless networks are being upgraded to simultaneously support fourth generation (4G) communication standards and network elements. However, 4G network elements use different data usage records that are generally not compatible with existing billing systems for 2G and 3G wireless networks. As such, wireless communication providers typically must incur the cost of a separate billing system or billing software module for 4G wireless networks as part of an upgrade.

SUMMARY

In an embodiment, the present disclosure is directed, in part, to a method for converting mobile communications network billing records. The method includes receiving, by a billing record converter system, a first data usage billing record associated with a mobile computing device communicatively coupled to a long term evolution (LTE) wireless communications network. The first data usage billing record can be formatted according to a real-time data usage billing record format. The method also includes converting, by the billing record converter system, the first data usage billing record formatted according to the real-time data usage billing record format into a second data usage billing record formatted according to a roaming data usage record format. The roaming data usage record format can correspond to a legacy wireless communications network different from the LTE wireless communications network. Further, the method includes transmitting, by the billing record converter system, the second data usage billing record to a billing system of the legacy wireless communications network for processing.

In some embodiments of the method, the real-time data usage billing record format is a 3rd generation partnership project online charging system format and the roaming data usage record format is a Transferred Account Procedure (TAP) format. Additionally, in some embodiments of the method, the legacy wireless communications network is a third generation (3G) wireless communications network. In embodiments of the method, transmitting the second data usage billing record to the billing system of the legacy wireless communications network can include transmitting the second data usage billing record to a roaming data usage record exchanger of the legacy wireless communications network for forwarding to the billing system.

Additionally, in some embodiments, the method includes receiving, by the billing record converter system and during a communications session, additional data usage billing records associated with the mobile computing device communicatively coupled to the LTE wireless communications network. In such embodiments, the additional data usage billing records can be formatted according to the real-time data usage billing record format. The method of such embodiments can further include cumulating, by the billing record converter system, the first data usage billing record and the additional data usage billing records received during the communications session into a cumulated data usage billing record formatted according to the real-time data usage billing record format. Additionally, in such embodiments, the method includes determining, by the billing record converter system, whether the communications session of the mobile computing device communicatively coupled to the LTE wireless communications network has ended. In such embodiments of the method, converting the first data usage billing record into the second data usage billing record can include converting, in response to a determination that the communications session has ended, the cumulated data usage billing record formatted according to the real-time data usage billing record format into the second data usage billing record formatted according to the roaming data usage record format.

Further, in some embodiments, the method can also include receiving, by the billing record converter system and during a communications session, additional data usage billing records associated with the mobile computing device communicatively coupled to the LTE wireless communications network. The additional data usage billing records can be formatted according to the real-time data usage billing record format. In such embodiments, the method further includes cumulating, by the billing record converter system, the first data usage billing record and the additional data usage billing records received during the communications session into a cumulated data usage billing record formatted according to the real-time data usage billing record format. The method of such embodiments also includes determining, by the billing record converter system, an amount of data used by the mobile computing device during the communications session based on the first data usage billing record and the additional data usage billing records received during the communications session. Further, the method of such embodiments includes determining, by the billing record converter system, whether the determined amount of data used by the mobile computing device during the communications session satisfies a reference data usage threshold. In such embodiments of the method, converting the first data usage billing record into the second data usage billing record can include converting, in response to a determination that the determined amount of data used by the mobile computing device satisfies the reference data usage threshold, the cumulated data usage billing record formatted according to the real-time data usage billing record format into the second data usage billing record formatted according to the roaming data usage record format.

In some embodiments, the method further includes determining, by the billing record converter system, a predicted amount of data to be used by the mobile computing device during the communications session based at least in part on historical data usage patterns of the mobile computing device and configuring, by the billing record converter system, the reference data usage threshold as a function of the predicted amount of data to be used by the mobile computing device during the communications session. In other embodiments, the method also includes determining, by the billing record converter system, a predicted amount of data to be used by the mobile computing device during the communications session based at least in part on historical data usage patterns of other mobile computing devices communicatively coupled to the LTE wireless communications network and configuring, by the billing record converter system, the reference data usage threshold as a function of the predicted amount of data to be used by the mobile computing device during the communications session. Alternatively, the method can further include determining, by the billing record converter system, a type of the communications session associated with first data usage billing record and the additional data usage billing records and modifying, by the billing record converter system, the reference data usage threshold based at least in part on the determined type of the communications session. In other embodiments, the method can include determining, by the billing record converter system, an amount of time elapsed for the communications session and modifying, by the billing record converter system, the reference data usage threshold based at least in part on the determined amount of time elapsed for the communications session.

In another embodiment, the present disclosure is directed, in part, to a system for converting mobile communications network billing records. The system includes a billing record converter system having a processor executing instructions stored in memory. The instructions, when executed, cause the processor to receive a first data usage billing record associated with a mobile computing device communicatively coupled to a long term evolution (LTE) wireless communications network. The first data usage billing record can be formatted according to a real-time data usage billing record format. The instructions also cause the processor to convert the first data usage billing record formatted according to the real-time data usage billing record format into a second data usage billing record formatted according to a roaming data usage record format, the roaming data usage record format corresponds to a legacy wireless communications network different from the LTE wireless communications network. Additionally, the instructions cause the processor to transmit the second data usage billing record to a billing system of the legacy wireless communications network for processing.

In some embodiments, the real-time data usage billing record format can be a 3rd generation partnership project online charging system format and the roaming data usage record format can be a Transferred Account Procedure (TAP) format. Additionally or alternatively, the legacy wireless communications network is a third generation (3G) wireless communications network. Additionally, in some embodiments, the instructions to transmit the second data usage billing record to the billing system of the legacy wireless communications network include instructions to transmit the second data usage billing record to a roaming data usage record exchanger of the legacy wireless communications network for forwarding to the billing system.

Additionally, in some embodiments, the instructions further cause the processor of the billing record converter system to receive, during a communications session, additional data usage billing records associated with the mobile computing device communicatively coupled to the LTE wireless communications network. The additional data usage billing records can be formatted according to the real-time data usage billing record format. In such embodiments, the instructions also cause the processor to cumulate the first data usage billing record and the additional data usage billing records received during the communications session into a cumulated data usage billing record formatted according to the real-time data usage billing record format. The instructions of such embodiments further cause the processor to determine whether the communications session of the mobile computing device communicatively coupled to the LTE wireless communications network has ended. In such embodiments, the instructions to convert the first data usage billing record into the second data usage billing record include instructions to convert, in response to a determination that the communications session has ended, the cumulated data usage billing record formatted according to the real-time data usage billing record format into the second data usage billing record formatted according to the roaming data usage record format.

In some embodiments, the instructions of the billing record converter system further cause the processor to receive, during a communications session, additional data usage billing records associated with the mobile computing device communicatively coupled to the LTE wireless communications network. The additional data usage billing records can be formatted according to the real-time data usage billing record format. The instructions of such embodiments can further cause the processor to cumulate the first data usage billing record and the additional data usage billing records received during the communications session into a cumulated data usage billing record formatted according to the real-time data usage billing record format. Additionally, in such embodiments, the instructions can further cause the processor to determine an amount of data used by the mobile computing device during the communications session based on the first data usage billing record and the additional data usage billing records received during the communications session. The instructions of such embodiments can also cause the processor to determine whether the determined amount of data used by the mobile computing device during the communications session satisfies a reference data usage threshold. In such embodiments, the instructions to convert the first data usage billing record into the second data usage billing record include instructions to convert, in response to a determination that the determined amount of data used by the mobile computing device satisfies the reference data usage threshold, the cumulated data usage billing record formatted according to the real-time data usage billing record format into the second data usage billing record formatted according to the roaming data usage record format.

Additionally, in some embodiments, the instructions of the billing record converter system can also cause the processor to determine a predicted amount of data to be used by the mobile computing device during the communications session based at least in part on historical data usage patterns of the mobile computing device and configure the reference data usage threshold as a function of the predicted amount of data to be used by the mobile computing device during the communications session. In other embodiments, the instructions cause the processor to determine a predicted amount of data to be used by the mobile computing device during the communications session based at least in part on historical data usage patterns of other mobile computing devices communicatively coupled to the LTE wireless communications network and configure the reference data usage threshold as a function of the predicted amount of data to be used by the mobile computing device during the communications session. In yet other embodiments, the instructions can further cause the processor to determine a type of the communications session associated with first data usage billing record and the additional data usage billing records and modify the reference data usage threshold based at least in part on the determined type of the communications session. Additionally or alternatively, in some embodiments, the instructions cause the processor to determine an amount of time elapsed for the communications session and modify the reference data usage threshold based at least in part on the determined amount of time elapsed for the communications session

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
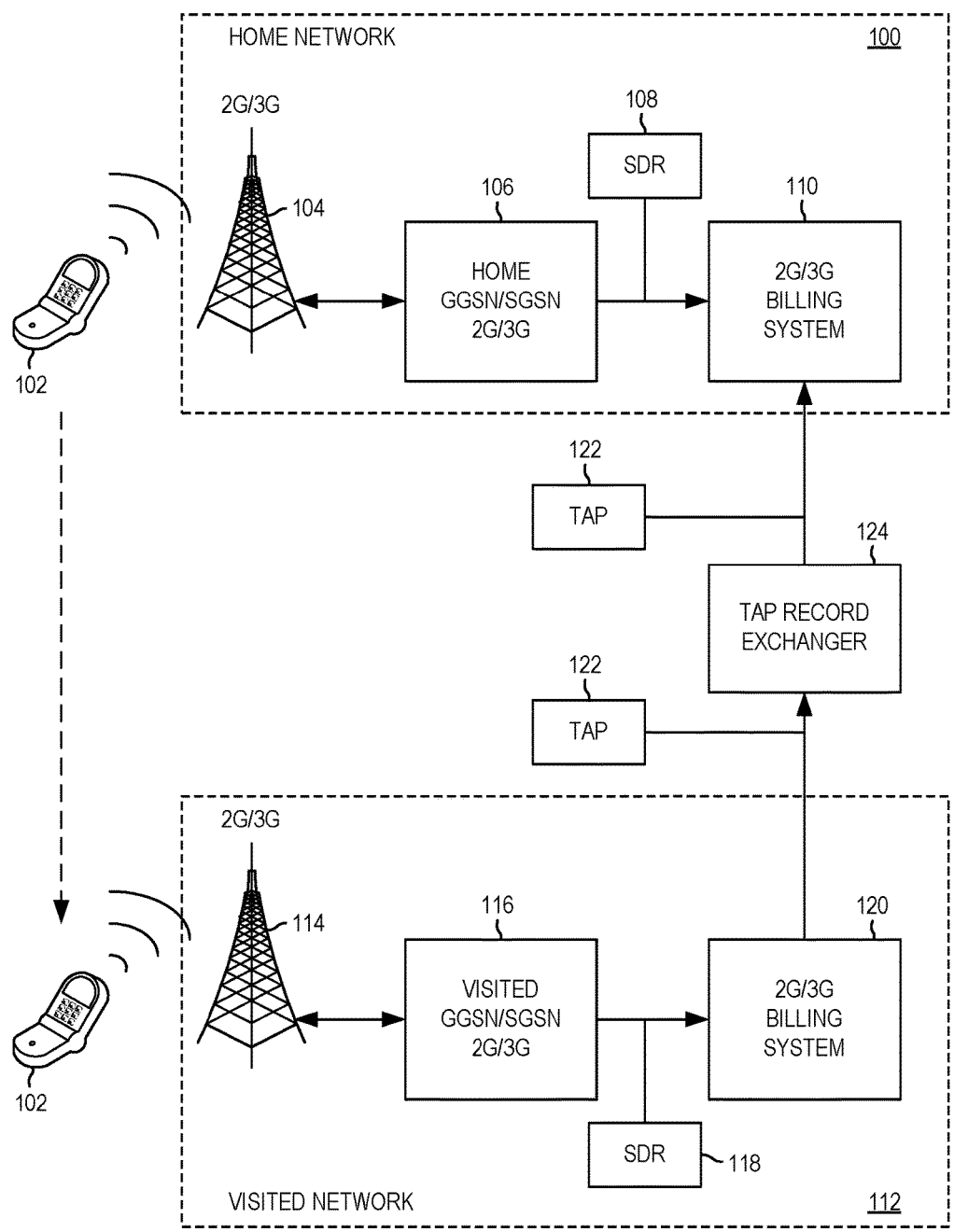
FIG. 1 is a simplified network diagram of at least one embodiment of a 2G/3G billing system for processing 2G and/or 3G data usage records that correspond to data usage by a mobile computing device on a 2G and/or 3G wireless communications network.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

The billing record converter technologies disclosed herein facilitate the deployment of 4G Long Term Evolution (4G LTE) network elements into existing carrier networks. It should be appreciated that in addition to facilitating the deployment of existing 4G LTE network elements into existing carrier networks, the billing record converter technologies disclosed herein can also facilitate the deployment of future evolutions of 4G LTE network elements into existing carrier networks. 4G LTE network elements use different data usage records that are generally not compatible with existing billing systems for 2G and 3G networks. The billing record converter technologies permit existing 2G and 3G billing systems to receive data usage records from 4G LTE network elements in the Transferred Account Procedure (TAP) record format. The data usage records from a 4G LTE network element are first converted into the TAP record format and then fed back to the billing system using the inbound TAP record Application Programming Interface (TAP record API) of the billing system. The TAP record API is intended for receiving data usage records for roaming subscribers in visited networks. By converting the data usage records of a 4G LTE network element into the TAP record format, the wireless service provider's billing systems can receive data usage records from a 4G LTE network elements as if those data usage records were roaming subscriber data usage records, even though the subscriber can be in the home network on a local 4G LTE network. The billing record converter technologies advantageously allow a wireless service provider to migrate to 4G LTE networks while continuing to use the wireless service provider's existing billing systems. The wireless service provider can run both 4G LTE and 2G or 3G networks using the same billing systems. A wireless service provider, or carrier, can deploy 4G LTE network elements and quickly provide 4G LTE service to wireless subscribers without incurring the cost of a separate billing system for their 4G LTE network.

The billing record converter technologies disclosed herein can also be configured to convert received data usage records formatted according to a new or enhanced data usage record format into data usage records formatted according to a previous or legacy data usage record format. For example, in some embodiments, the billing record converter technologies disclosed herein can be configured to convert data usage records received according to the GSMA TAP 3.12 (ver. 32.3) Format Specification (e.g., TAP 3.12 records) into data usage records formatted according to GSMA TAP 2 Format Specification (e.g., TAP 2 records). In doing so, the billing record converter technologies disclosed herein can down-convert received billing records into a format compatible with legacy billing systems and components thereof (e.g., a legacy TAP API). It should be appreciated that the billing record converter technologies disclosed herein can convert billing records to and from any other specification formats.

The billing record converter technologies can analyze data usage patterns and determine a predicted data usage for a user. The predicted data usage can be used to determine the amount of data billed in each data usage record. By setting the amount of data billed in each data usage record to approximately the predicted amount of data to be used by the user, the billing record converter technologies advantageously reduces the number of data usage records produced. Reducing the number of data usage records that are produced reduces the total bill volume which in turn reduces the cost of operating downstream billing systems. The billing record converter technologies can similarly be employed to reduce the number of billing records generated by 4G LTE systems that are sent to 4G LTE billing systems.

Additionally, in some embodiments, the billing record converter technologies disclosed herein can be configured to receive confirmation signaling from one or more Mobile Edge Computing (MEC) applications that execute or operate within a data tunnel between the EPC and an Evolved Node B (eNodeB) or other wireless network element. In such embodiments, the billing record converter technologies disclosed herein (e.g., the billing record converter system 210 of FIG. 2) can determine the content identifier (content ID), Categorized QoS, and a data count of content associated with such applications. Additionally, the billing record converter technologies can release one or a defined set of billing records associated with such content based at least in part on, or otherwise as a function of, an authorized content ID, Categorized QoS, and/or a predetermined or reference data volume count associated with the content. It should be appreciated that billing record converter technologies disclosed herein can also be configured to receive and process any other type of signaling and data associated with MEC applications, components, and/or entities as currently defined, or defined in the future, by the Mobile-Edge Computing Industry Specification Group or any other group or committee.

In some embodiments, the billing record converter technologies disclosed herein can also be configured to apply one or more deterministic bill creation rules after receiving signaling from any Voice over LTE (VoLTE) element through IMS signaling working within a data tunnel from the IMS through the EPC, eNodeB, and to an application within the UE. Additionally, the billing record converter technologies can be configured to apply one or more deterministic bill creation rules after receiving signaling associated with Device-to-Device (Proximity Service or "ProSe") direct user traffic communications defined in 3GPP Release 12 specifications. In some embodiments, only signaling passing through to a ProSe function within the EPC can be processed.

FIG. 1 depicts a network diagram of an example 2G network and/or 3G network. A wireless subscriber can use their mobile computing device 102, such as a cell phone or smart phone that supports a 2G or 3G network protocol, to place a call or use data on their home network 100. A radio tower 104, such as a cellular radio tower supporting 2G and/or 3G network protocols, can transmit data to, and receive data from, the mobile computing device 102 using a suitable radio frequency and protocol, such as the general packet radio service, or GPRS, running on an 850 MHz code division multiple access, or CDMA network, at 1×RTT or EV-DO speeds. Other frequencies and protocols can be used as would be understood by one of ordinary skill in the art.

In the example home network 100 of FIG. 1, when the wireless subscriber's mobile computing device 102 uses data on the home network 100, a GPRS support node 106 sends a session detail record, or SDR 108, to a billing system 110. The billing system 110 can load rating data into the wireless subscriber's bill for the data usage by the wireless subscriber's mobile computer device 102. The GPRS support node 106 can be a Gateway GPRS support node or a Serving GPRS support node as would be understood in the art.

The billing system 110 also includes a TAP record application programming interface, or TAP record API, that can receive billing records called TAP records 122 from other networks when a wireless subscriber uses the mobile computing device 102 in a visited network 112. The billing system 110 can include an inbound TAP record API for receiving TAP records 122 from wireless providers of the visited networks 112, called visited network operators (or VPMN as per the international naming convention for visited network operators). The billing system 110 can include an outbound TAP record API for sending TAP records 122 from the wireless provider of the home network 100, called the home network operator (or HPMN as per the international naming convention for home network operators) to another wireless network operator. A TAP record 122 can use the TAP3 format, or Transferred Account Procedure Data Record Format Specification, Version No. 3, which is an international standard that facilitates the interoperability of wireless mobile computing devices across networks 100, 112. The TAP record 122 can also use previous versions of TAP, future versions of TAP, or any other suitable type of record format as would be understood by one of ordinary skill in the art.

When the mobile computing device 102 of a wireless subscriber moves from the subscriber's home network 100 into a visited network 112, as illustrated by the dotted line of FIG. 1, the mobile computing device 102 will begin to transmit and receive data from a radio tower 114 in the visited network 112. The visited GSN 116 can authenticate the mobile computing device 102 and allow the wireless subscriber to roam in the visited network 112. The GSN 116 can send one or more session detail records, or SDR 118, to the billing system 120 of the visited network 112. Because the roaming wireless subscriber is not a customer of the wireless service provider of the visited network, or visited network operator, the billing system 120 cannot bill the wireless subscriber directly. The billing system 120 will forward a TAP record 122 to a TAP record exchanger 124, which can be a third party settlement agency such as Syniverse™. The TAP record exchanger 124 can send the TAP record 122 to the appropriate wireless service provider for billing the wireless subscriber. For example, the TAP record exchanger 124 can send the TAP record 122 to the inbound TAP record API of the billing system 110 in the wireless subscriber's home network 100. In an embodiment, the information in the TAP record 122 received by the TAP record exchanger 124 is the same as the information in the TAP record 122 that is sent to the inbound TAP record API of the billing system 110. In an embodiment, the TAP record exchanger 124 can modify information in the TAP record 122 prior to sending the TAP record 122 to the inbound TAP record API of the billing system 110. In a configuration, multiple TAP records 122 can be sent between billing systems 110, 120 and the TAP record exchanger 124.

Figure 2:
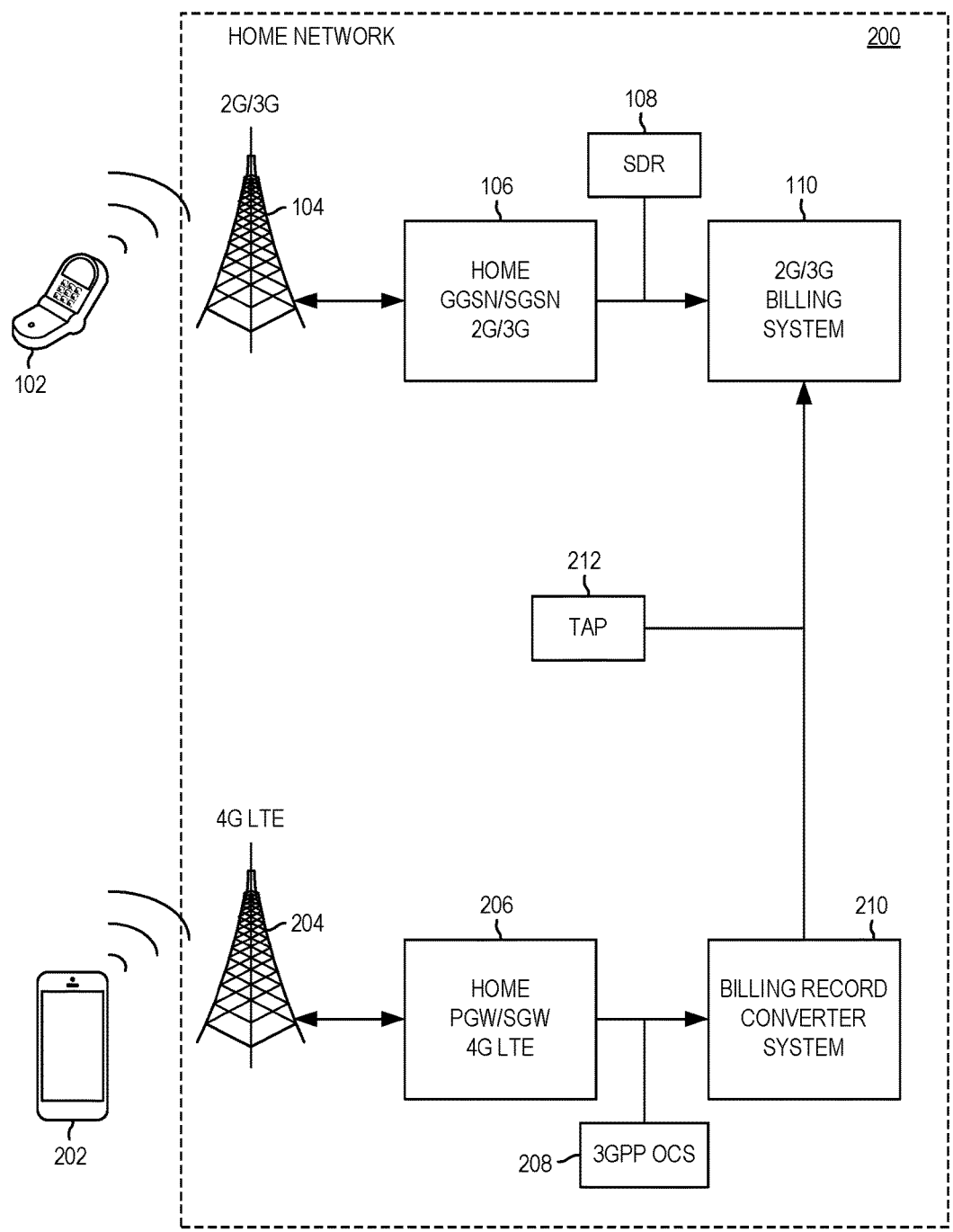
FIG. 2 is a simplified network diagram of at least one embodiment of a billing record converter system for converting 4G data usage records that correspond to data usage by a mobile computing device on a 4G wireless communications network into a format suitable for processing by the 2G/3G billing system of FIG. 1.

Referring now also to FIG. 2, a billing record converter system 210 can allow a wireless service provider to offer 4G LTE service in a home network 200, but continue to use the existing billing system 110. Wireless subscribers using 2G or 3G mobile computing devices 102 can continue to use the 2G or 3G radio towers 104, and the GPRS support node 106 can send SDRs 108 to the billing system 110 as described in FIG. 1. Wireless subscribers using newer mobile computing devices 202 that support the 4G LTE protocol can communicate with radio towers 204 that support 4G LTE services. In a configuration, the same physical radio tower 104 can be used with different electronics and antennae to support 4G LTE service. A 4G LTE network element 206 in the 4G LTE network can include a packet data network (PDN) gateway, or PGW, and a serving gateway, or SGW, among other modules.

Figure 3:
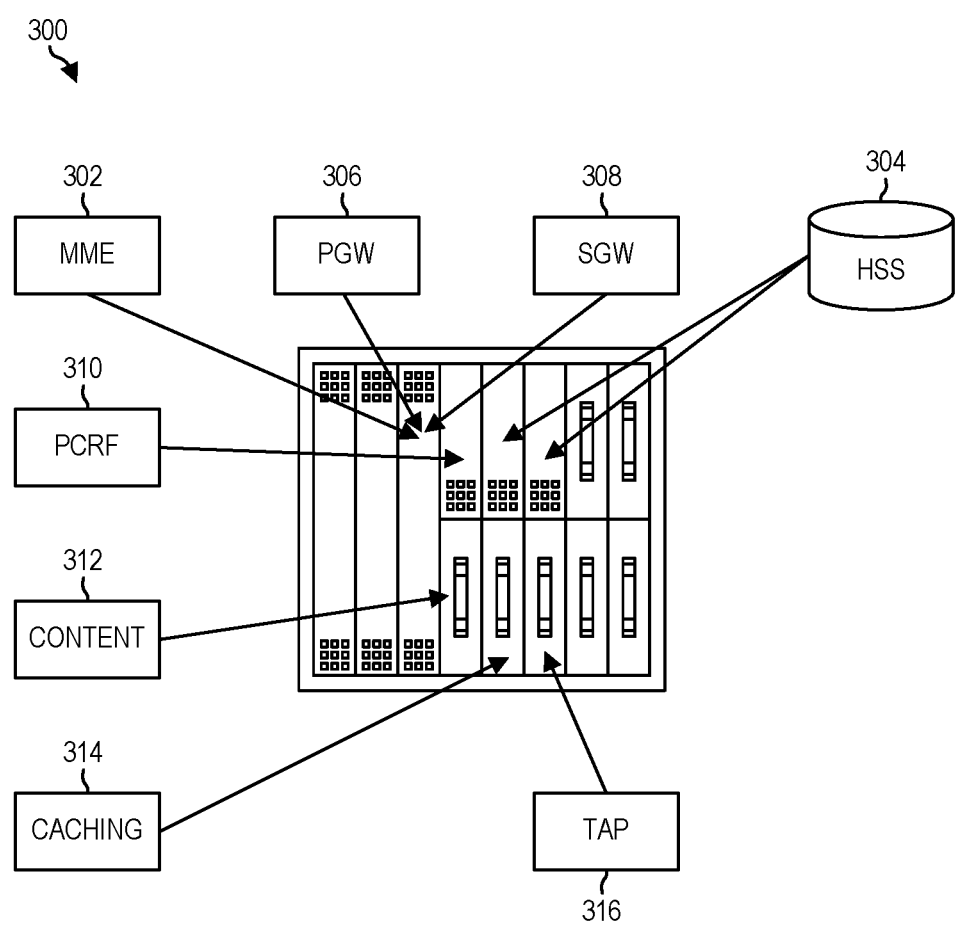
FIG. 3 is a simplified block diagram of at least one embodiment of a 4G wireless communications network element that includes the billing record converter system of FIG. 2.

The new 4G LTE network elements send billing records using a standard called 3GPP OCS, or 3rd generation partnership project online charging system, that permits communication service providers such as wireless service providers to charge wireless subscribers in real time. The 4G LTE network element 206 can create 3GPP OCS records 208 based on the data usage of the mobile computing device 202 on the 4G LTE network. A wireless service provider's billing system 110 for 2G and 3G networks generally cannot natively support 3GPP OCS records 208. To overcome this limitation, the billing record converter system 210 can receive the 3GPP OCS records 208 from the 4G LTE network element 206, and create one or more new TAP records 212 that are sent to the billing system 110. The billing system 110 therefore receives these new TAP records 212 associated with the mobile computing device 202 on the new 4G LTE network as if the mobile computing device 202 was roaming on the 2G or 3G visited network 112 of FIG. 1. The billing record converter system 210 can be a blade server that physically resides in the 4G LTE network element 206 and interfaces with other modules such as the PGW 306 and SGW 308 across a backplane, as illustrated in FIG. 3 and as described in further detail below. In various embodiments, the billing record converter system 210 can be a standalone server, a cloud based service, a blade server that resides in other 4G LTE equipment, one or more processes executing in the 4G LTE network element 206, for example the MME 302 of FIG. 3, or another suitable hardware platform or software module as would be generally understood by one of ordinary skill in the art.

Referring now also to FIG. 3, an example 4G LTE network element 300 is presented. The 4G LTE network element 300 can include modules for supporting the evolved packet core, or EPC protocol stack, of the 4G LTE network. A mobile management entity, or MME 302, controls the connection of user equipment, or UE, such as the mobile computing devices 202 of FIG. 2 to the 4G LTE network. A home subscriber service, or HSS module 304, identifies and authenticates UE on the home network. A serving gateway, or SGW 308, and a packet data network (PDN) gateway, or PGW 306, connect the UE to a network, such as the Internet. A policy and change function, or PCRF 310, prioritizes certain types of data over other types of data. For example, the PCRF 310 prioritizes voice data to ensure low latency reliable delivery.

Other modules 312, 314 store configuration and general content including, for example, elements of MEC applications, payment applications, pre-paid content, push advertisements/promotional content, profile triggered content, location service triggered content, and/or access method triggered content, all of which are as defined and understood by one of ordinary skill in the art. Additionally or alternatively, the other modules 312, 314 can perform caching functions. A TAP server blade 316 can perform the billing record converter system 210 described above in reference to FIG. 2, for example by receiving 3GPP OCS records, creating TAP records, and forwarding the TAP records to a billing system, third party settlement agency, or other suitable system. An example TAP server blade 316 is described in further detail with regard to FIG. 5 below.

Figure 4:
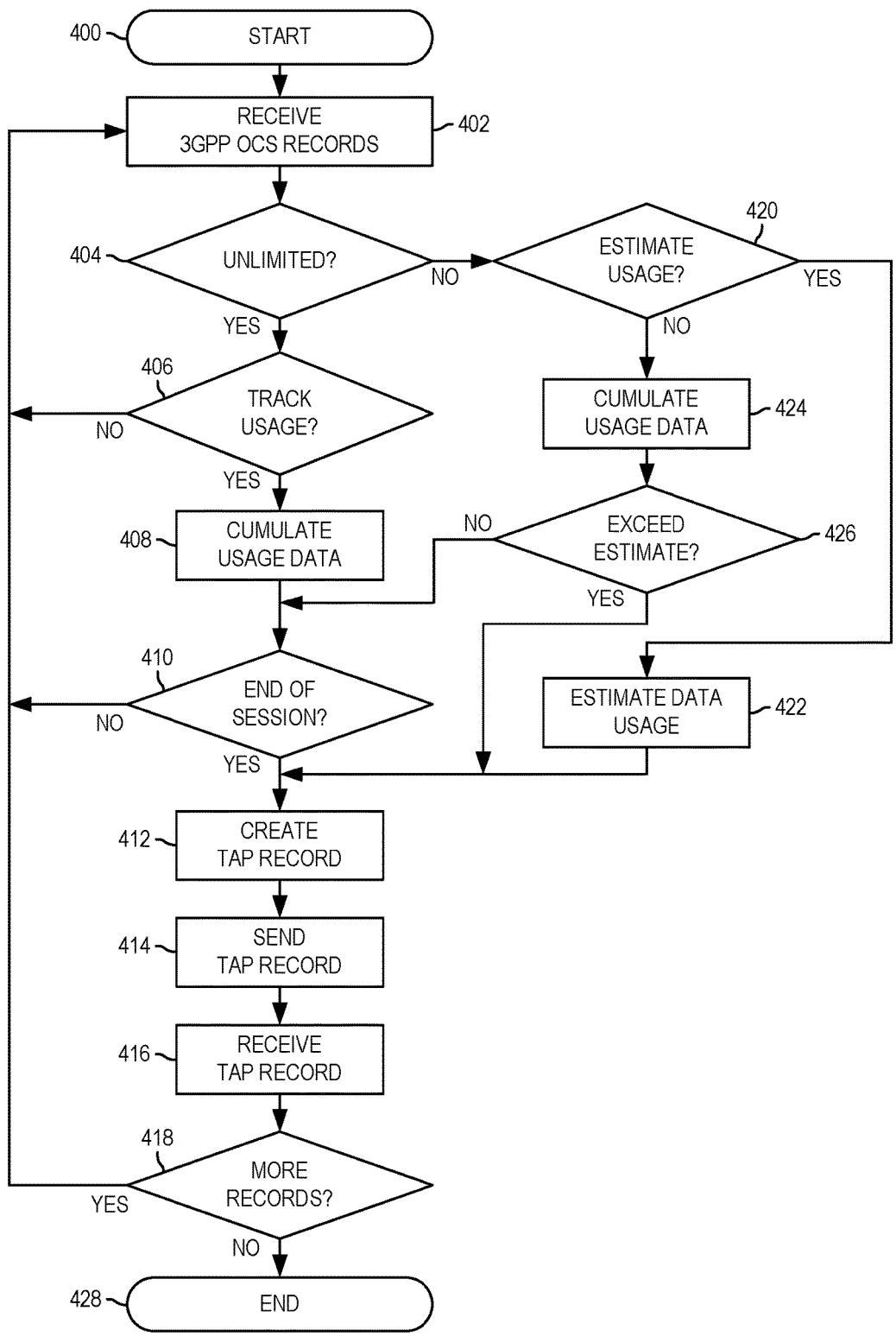
FIG. 4 is a simplified flow diagram of at least one embodiment of a method that may be executed by the billing record converter system of FIGS. 2 and 3 for converting 4G data usage records into a format suitable for processing by the 2G/3G billing system of FIG. 1.

Referring now to FIG. 4, example operations of the billing record converter system 210 are shown. Processing begins at start block 400 labeled START and continues to process block 402.

In process block 402, the billing record converter system 210 receives data usage detail records 208 from a 4G LTE network element 206. For example, the data usage detail records 208 can be one or more 3GPP OCS records 208. The 3GPP OCS records 208 can be associated with a mobile computing device, for example a mobile computing device 202 that is in the home network 200 of a wireless service provider. In a configuration, the data usage detail record 208 can be a session detail record (SDR). Processing continues to decision block 404.

In decision block 404, if wireless subscriber has an unlimited data plan, then processing continues to decision block 406; otherwise, if the wireless subscriber is on a pay-per-use data plan then processing continues to decision block 420. Additionally, in decision block 404, if a MEC application is associated with an authorized Content ID, Categorized QoS, and volume count and/or if the wireless subscriber is engaged in a VoLTE session or a Device-to-Device session, then processing also continues to decision block 406, in some embodiments. In such embodiments, one or more deterministic rules can be applied to manage the number of billing records.

In decision block 406, if the wireless usage of a wireless subscriber with an unlimited data plan is tracked, then processing continues to process block 408, otherwise processing returns to process block 402 to receive additional data usage detail records such as 3GPP OCS records 208.

In process block 408, the data usage of a wireless subscriber with an unlimited data plan can be tracked. For example, a commercially available EPC protocol stack (the Evolved Packet Core protocol stack used in 4G LTE networks) can include metering software that includes a counter. For a wireless subscriber with an unlimited data plan, the data usage can be cumulated until the end of a session for the wireless subscriber and then a single data usage record (e.g., TAP 212) can be sent in process block 414. In various embodiments, the data usage record can be a TAP record 212, a 3GPP OCS record 208, or another suitable data usage record. For example, in the illustrative embodiment, the data usage record is a TAP 3.12 (version 32.3) record. In other examples, the data usage record can be formatted according to a previous version of the TAP Format Specification or more current version of the TAP Format Specification. Advantageously, this can substantially reduce the number of TAP records 212 or other data usage records that are sent to the billing system 110, while permitting tracking of the wireless subscriber's data usage. Reducing the number of records sent to the billing system 110 can reduce operating costs of the billing system 110 and reduce third party charges for records forwarded to other service providers or billing processors. Processing continues to decision block 410.

In decision block 410, if the wireless subscriber with an unlimited data plan has ended the data session, then processing continues to process block 412 where a TAP record 212 and/or other data usage record can be created. Otherwise, processing returns to process block 402 to receive additional data usage records, such as 3GPP OCS records 208, for the data session of the wireless subscriber.

In process block 412, the billing record converter system 210 can create TAP records 212 for the data used by the wireless subscriber. In an embodiment, a data usage record compatible with a 4G LTE billing system can be created in parallel or instead of creating a TAP record 212. In that embodiment, the process steps described herein can include operations of sending and receiving data usage records to 4G LTE billing systems in addition to or instead of TAP records 212. Processing continues to process block 414.

In process block 414, the billing record converter system 210 sends the TAP record 212 to an appropriate system. For example, the billing record converter system 212 can transmit the TAP record 212 to the inbound TAP record API of the billing system 110 or some other 2G/3G billing system. Processing continues to process block 416.

In process block 416, the TAP record 212 from process blocks 412 and 414 can be received. For example, the billing system 110 (or another 2G/3G billing system) can receive the TAP record 212 on the inbound TAP record API of the billing system 110. Processing continues to decision block 418.

In decision block 418, if more data usage records (e.g., 3GPP OCS records 208) are to be received by the billing record converter system 210, the processing returns to process block 402 to receive additional data usage records from the 4G LTE network element 206. Otherwise, processing terminates in end bock 428 labeled END.

In decision block 420, if the data usage of the wireless subscriber on a pay-per-use data plan needs to be estimated, for example if the wireless subscriber initiated a new data or communications session, then processing continues to process block 422.

In process block 422, the data usage of a wireless subscriber is estimated. For example, a commercially available EPC protocol stack (e.g., the Evolved Packet Core protocol stack used in 4G LTE networks) can include metering software that includes a configurable counter or a configurable reference data usage threshold. The metering software can determine the configurable counter or reference data usage threshold according to the anticipated data usage of the wireless subscriber. The metering software can determine, or predict, the anticipated data usage based on previous usage patterns of the wireless subscriber and/or the mobile computing device 202, the application being used by the wireless subscriber, and the data usage of other subscribers and/or other mobile computing devices, among other example usage patterns as would be understood by one of ordinary skill in the art. In a configuration, the configurable counter and/or configurable reference data usage threshold can default to a common size for all wireless subscribers or UE (user entity, such as a mobile computing device or smartphone.) For example, the configurable counter and/or reference data usage threshold can be configured to 400 k, and a new TAP record 212 can be sent in process block 412 for every 400 k of data used by the wireless subscriber with a pay-per-use data plan. In another configuration, the configurable counter and/or reference data usage threshold can be smaller or larger depending upon, at least in part, trending information about the wireless subscriber that is available to the system, or typical wireless subscriber usage profiles.

For example, the configurable counter and/or reference data usage threshold for a new wireless subscriber to the system can be configured to be 200 k, initially. If additional information about the wireless subscriber is available, then the configurable counter and/or reference data usage threshold can be based on historical patterns for the wireless subscriber. For example, the previous five data sessions for a wireless subscriber can be averaged to determine the initial configuration of the configurable counter/threshold. In a configuration, if the user is executing a particular service, for example email synchronizing, then the initial configuration of the configurable counter and/or reference data usage threshold can be set to a value appropriate for that service. In various configurations, the configuration of the configurable counter/threshold can be ramped up or down based on any suitable factors including, but not limited to, the type of session, the website visited, whether an application is an application that pushes or pulls data, the ongoing amount of time spent on the same website or the same session, and so forth. In a configuration, the configurable counter and/or reference data usage threshold can dynamically change as the wireless subscriber's use changes. For example, the configurable counter/threshold can dynamically change based on the application the wireless subscriber uses, for example by using the average data usage for the last five instances the subscriber used the application. Other suitable configurations are also contemplated. The wireless subscriber's historical patterns can be stored in the HSS module 304 of the 4G LTE network element 300 of FIG. 3.

In an embodiment, trending and other suitable information stored in the HSS module 304 can be shared with other 4G LTE network elements. In this way, trending information available to one 4G LTE network element can be shared so that each 4G LTE network element can benefit from the trending information generated by other 4G LTE network elements for wireless subscribers. For example, when a wireless subscriber is roaming, the roaming 4G LTE networks elements can receive trending and other information about the wireless subscriber's data usage from the home area HSS module 304. The information can be transmitted to the roaming 4G LTE network elements using HSS messages sent via 4G LTE signaling networks, such as those used in Diameter Signaling as would be understood in the art. Similarly, trending and other information for inbound roaming wireless subscribers entering the home network can be received by the billing record converter system 210 and used to set the data usage size for creating billing records. Processing continues to process block 412 where a TAP record 212 for the initial data use is created.

In process block 422, if the data use of the wireless subscriber of decision block 420 did not need to estimated, adjusted, or re-estimated, then the current data use of the wireless subscriber is cumulated, for example using the configurable counter and/or reference data usage threshold of process block 422. Processing continues to decision block 426.

In decision block 426, if data usage of the wireless subscriber cumulated in process block 424 has not exceeded the estimated data usage configured in the configurable counter and/or reference data usage threshold, then processing continues to decision block 410 where a determination can be made as to whether the session has ended (and therefore whether a TAP record 212 in process block 412 can be created). Otherwise, if the data usage of the wireless subscriber has exceeded estimated data usage, then a new TAP record 212 can be created and processing continues to process block 412. The billing record converter system 210 can adjust the configurable counter or data usage to reflect the amount billed to the wireless subscriber in the TAP record 212 of process block 412. For example, the billing record converter system 210 can subtract the amount billed in the TAP record 212 from the current cumulated usage data. In another example, the billing record converter system 210 can re-estimate the data usage in decision block 420. Other suitable means of keeping track of the ongoing data usage and the billed data usage can be used as well as would be understood by one of ordinary skill in the art.

Although the processes described above generally refer to creating a reduced set of TAP records 212, similar processes can also be used to reduce the number of 4G LTE billing records. Advantageously, the described processes can substantially reduce the number of data usage records that are sent to either or both 2G/3G and 4G LTE billing systems. For example, in an embodiment, software executing in the 4G LTE network element 206 can use a similar methodology to that described above to determine when to create a new data usage record, such as a 3GPP OCS record 208. In another embodiment, the billing record converter system 210 can receive 3GPP OCS records 208 and create a reduced number of 3GPP OCS records 208 that are sent to 4G LTE billing systems. In a home network 200, the described processes can reduce the operating expense of the 4G LTE billing system by reducing the number of data usage records that need to be processed. When a wireless subscriber is in a visited network, 3GPP OCS or other data usage records can be sent to a third party billing processor for routing to the appropriate billing system. Reducing the number of records can substantially reduce the transaction costs associated with third party billing processors as transaction costs are generally based on the number of records processed. Reducing the number of data usage records can also decrease the required bandwidth necessary to transport the data usage records, allowing for additional savings in terms of network costs.

In an embodiment, a billing record converter system and the processes and the technologies described above can be utilized to allow a 2G/3G wireless service provider to initially deploy 4G LTE network elements into the wireless service provider's network that can interoperate with existing 2G/3G billing systems. Additionally, the billing record converter system and/or the processes described above can improve the operation of, and reduce costs associated with operating, 4G LTE billing systems as they are deployed. Therefore, the solutions described herein are applicable to both migrations of 2G/3G networks to 4G LTE networks, and improving the operation of native 4G LTE networks in general.

Figure 5:
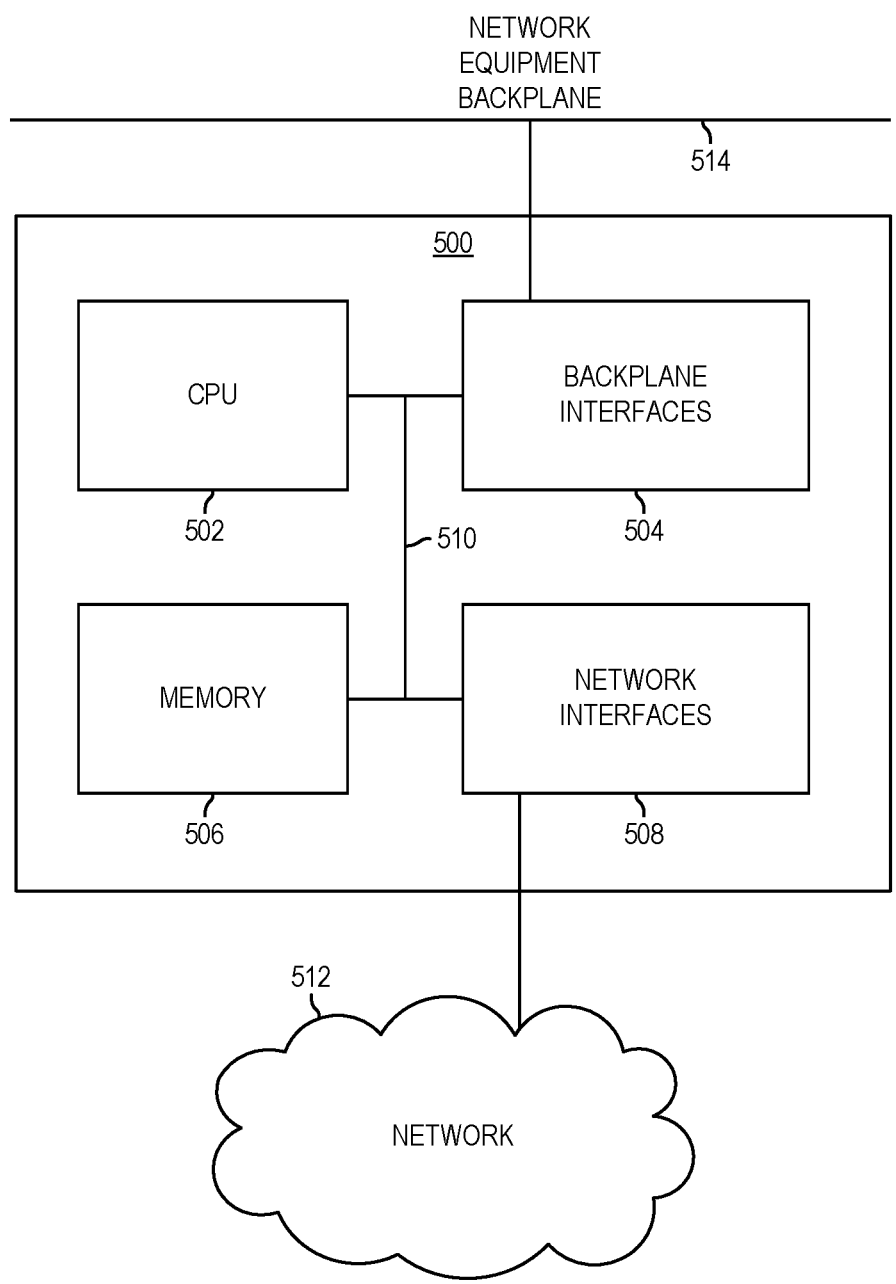
FIG. 5 is a simplified block diagram of at least one embodiment of the billing record converter system of FIGS. 2 and 3.

The processes described above can be performed on or between one or more computing devices 500 associated with the billing record converter system 210. Referring now to FIG. 5, an example computing device 500 of a billing record converter system 210 is presented. The computing device 500 can be a server, and can be integrated with other systems or subsystems, such as the 4G LTE network element 300 of FIG. 3. Other computing devices 500 are also contemplated, including but not limited to stand-alone servers, cloud-based computing capability, and processes executing on the 4G LTE network element, other network elements, or mobile devices.

The computing device 500 can be any suitable computing device as would be understood in the art, including without limitation, a custom chip, an embedded processing device, a desktop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others.

The computing device 500 also includes one or more memories 506, for example read only memory (ROM), random access memory (RAM), cache memory associated with the processor 502, or other memories such as dynamic RAM (DRAM), static RAM (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or BluRay disc, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

If the computing device 500 is a blade server, or interface card, that is configured to be inserted into, and reside in, a network element such as a 4G LTE network element, then the computing device 500 can include backplane interfaces 504. The backplane interfaces 504 can be configured to communicate on one or more buses or communication channels on a backplane 514 of a network element. The signaling, power, and data links of the backplane interfaces 504 can be proprietary and/or standards based. For example, backplane interfaces 504 can be based on time-division multiplexing, telecom standards based interfaces such as SONET or synchronous optical network interfaces, or data communication based standards such as serial, parallel, X.25, Ethernet, TCP/IP, UDP/IP, IP, Frame Relay, ATM, and so forth. Other interfaces can also be used as would be understood by one of ordinary skill in the art. The backplane interfaces 504 can include one or more data links for transmitting and/or receiving data from other modules of the network element.

In a configuration, the billing record converter system 210 is software executing on a blade server that inserts into, and resides in, a 4G LTE network element or kit, which is often mounted in a 19-inch or 23-inch telecom rack. In one embodiment, the 3GPP OCS records 208 are received from other modules of the 4G LTE network element over the backplane, for example from the MME 302 of FIG. 3. In another embodiment the 3GPP OCS records 208 can be received through a network interface on the front panel of the blade server. The network interface can also be connected via wiring to a wiring panel associated with the 4G LTE network element. Similarly, in different embodiments, the TAP records 212 created by the billing record converter system 210 can be output over the backplane 514 to other modules of the 4G LTE network, or through network and communication interfaces 508 associated with the blade server. Other ways of receiving 3GPP OCS records 208 and transmitting TAP records 212 can also be used, including but not limited to using other backplane or networking interfaces, using tunneling protocols, using wireless protocols, embedding TAP records 212 or information in other records or protocols, and so forth.

The network and communication interfaces 508 can be configured to transmit to, or receive data from, other computing devices 500 across a network 512. For example, a remote billing system can receive TAP records 212 from the billing record converter system 210 over a network or communications interface as described herein. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wired data transmission links such as Ethernet and TCP/IP. The communication interfaces 508 can include wireless protocols for interfacing with private or public networks 512. For example, the network and communication interfaces 508 and protocols can include interfaces for communicating with private wireless networks 512 such as a WiFi network, one of the IEEE 802.11x family of networks, or another suitable wireless network. The network and communication interfaces 508 can include interfaces and protocols for communicating with public wireless networks 512, using for example wireless protocols used by cellular network providers, including Long Term Evolution (LTE), Code Division Multiple Access (CDMA) and Global System for Mobile Communications (GSM). The computing device 500 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices and network communication interfaces 508. Example input and output devices (not shown) include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for converting mobile communications network billing records, performed by a processor of a billing record converter system executing instructions stored in a memory, the method comprising:

receiving a first data usage billing record associated with a mobile computing device communicatively coupled to a long term evolution (LTE) wireless communications network, the first data usage billing record generated by a processor of an LTE network element executing instructions stored in memory, the first data usage billing record is formatted according to a real-time data usage billing record format;

receiving additional data usage billing records associated with the mobile computing device communicatively coupled to the LTE wireless communications network, the additional data usage billing records are formatted according to the real-time data usage billing record format;

cumulating the first data usage billing record and the additional data usage billing records into a cumulated data usage billing record formatted according to the real-time data usage billing record format;

determining a predicted amount of data to be used by the mobile computing device during a communications session based at least in part on historical data usage patterns of the mobile computing device;

converting, based at least in part on the predicted amount of data to be used by the mobile computing device during the communications session, the cumulated data usage billing record formatted according to the real-time data usage billing record format into a second data usage billing record formatted according to a roaming data usage record format, the roaming data usage record format corresponds to a legacy wireless communications network different from the LTE wireless communications network; and transmitting the second data usage billing record to a billing system of the legacy wireless communications network for processing, the billing system of the legacy wireless communications network comprising a processor executing instructions stored in memory.

2. The method of claim 1, wherein the real-time data usage billing record format is a 3rd generation partnership project online charging system format and the roaming data usage record format is a Transferred Account Procedure (TAP) format.

3. The method of claim 1, wherein the legacy wireless communications network is a third generation (3G) wireless communications network.

4. The method of claim 1, wherein transmitting the second data usage billing record to the billing system of the legacy wireless communications network comprises transmitting the second data usage billing record to a roaming data usage record exchanger of the legacy wireless communications network for forwarding to the billing system.

5. The method of claim 1, further comprising determining whether a communications session of the mobile computing device communicatively coupled to the LTE wireless communications network has ended;

wherein receiving the additional data usage billing records comprises receiving the additional data usage billing records during the communications session; and wherein converting the cumulated data usage billing record comprises converting, based at least in part on the predicted amount of data to be used by the mobile computing device during the communications session and in response to a determination that the communications session has ended, the cumulated data usage billing record into the second data usage billing record.

6. A method for converting mobile communications network billing records, performed by a processor of a billing record converter system executing instructions stored in a memory, the method comprising:

receiving a first data usage billing record associated with a mobile computing device communicatively coupled to a long term evolution (LTE) wireless communications network, the first data usage billing record generated by a processor of an LTE network element executing instructions stored in memory, the first data usage billing record is formatted according to a real-time data usage billing record format;

receiving additional data usage billing records associated with the mobile computing device communicatively coupled to the LTE wireless communications network, the additional data usage billing records are formatted according to the real-time data usage billing record format;

cumulating the first data usage billing record and the additional data usage billing records into a cumulated data usage billing record formatted according to the real-time data usage billing record format;

determining a type of a communications session associated with the first data usage billing record and the additional data usage billing records;

converting, based at least in part on the determined type of the communications session associated with the first data usage billing record and the additional data usage billing records, the cumulated data usage billing record formatted according to the real-time data usage billing record format into a second data usage billing record formatted according to a roaming data usage record format, the roaming data usage record format corresponds to a legacy wireless communications network different from the LTE wireless communications network; and transmitting the second data usage billing record to a billing system of the legacy wireless communications network for processing, the billing system of the legacy wireless communications network comprising a processor executing instructions stored in memory.

7. The method of claim 6, wherein the real-time data usage billing record format is a 3rd generation partnership project online charging system format and the roaming data usage record format is a Transferred Account Procedure (TAP) format.

8. The method of claim 6, wherein the legacy wireless communications network is a third generation (3G) wireless communications network.

9. The method of claim 6, wherein transmitting the second data usage billing record to the billing system of the legacy wireless communications network comprises transmitting the second data usage billing record to a roaming data usage record exchanger of the legacy wireless communications network for forwarding to the billing system.

10. The method of claim 6, further comprising determining whether a communications session of the mobile computing device communicatively coupled to the LTE wireless communications network has ended;

wherein receiving the additional data usage billing records comprises receiving the additional data usage billing records during the communications session; and wherein converting the cumulated data usage billing record comprises converting, based at least in part on the determined type of the communications session associated with the first data usage billing record and the additional data usage billing records and in response to a determination that the communications session has ended, the cumulated data usage billing record into the second data usage billing record.

11. A method for converting mobile communications network billing records, performed by a processor of a billing record converter system executing instructions stored in a memory, the method comprising:

receiving a first data usage billing record associated with a mobile computing device communicatively coupled to a long term evolution (LTE) wireless communications network, the first data usage billing record generated by a processor of an LTE network element executing instructions stored in memory, the first data usage billing record is formatted according to a real-time data usage billing record format;

determining whether the mobile computing device is associated with an unlimited data plan or a pay-per-use-data plan;

receiving additional data usage billing records associated with the mobile computing device communicatively coupled to the LTE wireless communications network, the additional data usage billing records are formatted according to the real-time data usage billing record format;

cumulating the first data usage billing record and the additional data usage billing records into a cumulated data usage billing record formatted according to the real-time data usage billing record format;

converting the cumulated data usage billing record formatted according to the real-time data usage billing record format into a second data usage billing record formatted according to a roaming data usage record format as a function of a determination that the mobile computing device is associated with an unlimited data plan or a determination that the mobile computing device is associated with a pay-per-use-data plan, the roaming data usage record format corresponds to a legacy wireless communications network different from the LTE wireless communications network; and transmitting the second data usage billing record to a billing system of the legacy wireless communications network for processing, the billing system of the legacy wireless communications network comprising a processor executing instructions stored in memory.

12. The method of claim 11, wherein the real-time data usage billing record format is a 3rd generation partnership project online charging system format and the roaming data usage record format is a Transferred Account Procedure (TAP) format.

13. The method of claim 11, wherein the legacy wireless communications network is a third generation (3G) wireless communications network.

14. The method of claim 11, wherein transmitting the second data usage billing record to the billing system of the legacy wireless communications network comprises transmitting the second data usage billing record to a roaming data usage record exchanger of the legacy wireless communications network for forwarding to the billing system.

15. The method of claim 11, further comprising determining whether a communications session of the mobile computing device communicatively coupled to the LTE wireless communications network has ended;

wherein receiving the additional data usage billing records comprises receiving the additional data usage billing records during the communications session; and wherein converting the cumulated data usage billing record comprises converting, in response to a determination that the communications session has ended and as a function of a determination that the mobile computing device is associated with an unlimited data plan or a determination that the mobile computing device is associated with a pay-per-use-data plan, the cumulated data usage billing record into the second data usage billing record.

* * * * *